US011133524B2

United States Patent
Choi et al.

(10) Patent No.: US 11,133,524 B2
(45) Date of Patent: Sep. 28, 2021

(54) NEGATIVE ELECTRODE ACTIVE MATERIAL, NEGATIVE ELECTRODE INCLUDING THE SAME AND LITHIUM SECONDARY BATTERY INCLUDING THE SAME

(71) Applicant: LG CHEM, LTD., Seoul (KR)

(72) Inventors: Jung Hyun Choi, Daejeon (KR); Yong Ju Lee, Daejeon (KR); Eun Kyung Kim, Daejeon (KR)

(73) Assignee: LG CHEM, LTD., Seoul (KR)

(*) Notice: Subject to any disclaimer, the term of this patent is extended or adjusted under 35 U.S.C. 154(b) by 0 days.

(21) Appl. No.: 15/771,168

(22) PCT Filed: Jun. 2, 2017

(86) PCT No.: PCT/KR2017/005785
§ 371 (c)(1),
(2) Date: Apr. 26, 2018

(87) PCT Pub. No.: WO2017/209561
PCT Pub. Date: Dec. 7, 2017

(65) Prior Publication Data
US 2018/0342757 A1    Nov. 29, 2018

(30) Foreign Application Priority Data

Jun. 2, 2016 (KR) .................. 10-2016-0068940
Jun. 2, 2016 (KR) .................. 10-2016-0068956
Jun. 2, 2017 (KR) .................. 10-2017-0068856

(51) Int. Cl.
*H01M 10/0525* (2010.01)
*H01M 4/38* (2006.01)
(Continued)

(52) U.S. Cl.
CPC ....... *H01M 10/0525* (2013.01); *H01M 4/131* (2013.01); *H01M 4/134* (2013.01);
(Continued)

(58) Field of Classification Search
CPC ....... H01M 4/131; H01M 4/134; H01M 4/386
See application file for complete search history.

(56) References Cited

U.S. PATENT DOCUMENTS 8,753,774 B2   6/2014   Kawada
9,123,952 B2   9/2015   Kim et al.
(Continued)

FOREIGN PATENT DOCUMENTS

CN   102214824 A   10/2011
CN   103515583 A    1/2014
(Continued)

OTHER PUBLICATIONS

European Search Report for Appl. No. 17807054.6 dated Jan. 25, 2019.
(Continued)

*Primary Examiner* — Nathanael T Zemui
(74) *Attorney, Agent, or Firm* — Birch, Stewart, Kolasch & Birch, LLP

(57) ABSTRACT

The present invention relates to a negative electrode active material which includes a secondary particle including a first particle which is a primary particle, wherein the first particle includes a first core and a first surface layer which is disposed on a surface of the first core and contains carbon, and the first core includes a metal compound which includes one or more of a metal oxide and a metal silicate and one or more of silicon and a silicon compound; a method of preparing the same; an electrode including the same; and a lithium secondary battery including the same.

15 Claims, 4 Drawing Sheets

(51) Int. Cl.
  *H01M 4/583* (2010.01)
  *H01M 4/134* (2010.01)
  *H01M 4/131* (2010.01)
  *H01M 4/36* (2006.01)
  *H01M 4/62* (2006.01)
  *H01M 4/505* (2010.01)
  *H01M 4/525* (2010.01)
  *H01M 4/02* (2006.01)
  *C01B 33/023* (2006.01)

(52) U.S. Cl.
  CPC ......... *H01M 4/364* (2013.01); *H01M 4/366* (2013.01); *H01M 4/386* (2013.01); *H01M 4/505* (2013.01); *H01M 4/525* (2013.01); *H01M 4/583* (2013.01); *H01M 4/625* (2013.01); *C01B 33/023* (2013.01); *H01M 2004/021* (2013.01); *H01M 2004/027* (2013.01); *H01M 2004/028* (2013.01)

(56) References Cited

U.S. PATENT DOCUMENTS

| | | | |
|---|---|---|---|
| 9,780,367 B2 | 10/2017 | Kim et al. | |
| 9,947,922 B2 | 4/2018 | Yoo et al. | |
| 10,044,034 B2 | 8/2018 | Hotta et al. | |
| 2011/0062379 A1* | 3/2011 | Miyawaki | H01M 4/134 252/182.1 |
| 2011/0244333 A1* | 10/2011 | Kawada | H01M 4/131 429/231.8 |
| 2013/0004846 A1* | 1/2013 | Kim | H01M 4/364 429/213 |
| 2013/0059203 A1 | 3/2013 | Hong et al. | |
| 2013/0071750 A1 | 3/2013 | Park et al. | |
| 2013/0189575 A1 | 7/2013 | Anguchamy et al. | |
| 2013/0337314 A1 | 12/2013 | Essaki et al. | |
| 2014/0057176 A1* | 2/2014 | Park | H01M 4/366 429/220 |
| 2014/0162129 A1 | 6/2014 | Kim et al. | |
| 2014/0170485 A1 | 6/2014 | Lee et al. | |
| 2014/0322611 A1 | 10/2014 | Lee et al. | |
| 2014/0377653 A1 | 12/2014 | Park et al. | |
| 2015/0024275 A1 | 1/2015 | Ishida et al. | |
| 2015/0072240 A1 | 3/2015 | Yoo et al. | |
| 2015/0099187 A1* | 4/2015 | Cui | H01M 4/134 429/231.8 |
| 2015/0221950 A1 | 8/2015 | Minami et al. | |
| 2015/0333318 A1* | 11/2015 | Huang | H01M 4/134 429/338 |
| 2016/0006027 A1 | 1/2016 | Kim et al. | |
| 2016/0072152 A1* | 3/2016 | Tsubouchi | H01M 10/0569 429/341 |
| 2016/0087278 A1 | 3/2016 | Hotta et al. | |
| 2016/0372753 A1 | 12/2016 | Fukasawa et al. | |
| 2017/0170511 A1 | 6/2017 | Yu et al. | |
| 2017/0256792 A1 | 9/2017 | Kondo et al. | |
| 2017/0271651 A1 | 9/2017 | Behan et al. | |
| 2017/0373341 A1 | 12/2017 | Park et al. | |
| 2018/0090750 A1 | 3/2018 | Oh et al. | |
| 2018/0198116 A1 | 7/2018 | Aurora et al. | |

FOREIGN PATENT DOCUMENTS

| | | |
|---|---|---|
| CN | 104300138 A | 1/2015 |
| CN | 104854740 A | 8/2015 |
| CN | 105308776 A | 2/2016 |
| EP | 3136477 A1 | 3/2017 |
| JP | 2008-16446 A | 1/2008 |
| JP | 2010-170943 A | 8/2010 |
| JP | 2012-84521 A | 4/2012 |
| JP | 2014-116306 A | 6/2014 |
| JP | 2015-179593 A | 10/2015 |
| JP | 2016-508114 A | 3/2016 |
| JP | 2016-62833 A | 4/2016 |
| KR | 10-2005-0090218 A | 9/2005 |
| KR | 10-2011-0124728 A | 11/2011 |
| KR | 10-2013-0004536 A | 1/2013 |
| KR | 10-2013-0031778 A | 3/2013 |
| KR | 10-2013-0045212 A | 5/2013 |
| KR | 10-1342601 B1 | 12/2013 |
| KR | 10-2014-0048761 A | 4/2014 |
| KR | 10-2014-0070162 A | 6/2014 |
| KR | 10-1586818 B1 | 1/2018 |
| WO | WO 2014/049992 A1 | 4/2014 |
| WO | WO 2015/145521 A1 | 10/2015 |
| WO | WO 2016/011196 A1 | 1/2016 |
| WO | WO 2016-031126 A1 | 3/2016 |
| WO | WO 2016/085953 A1 | 6/2016 |
| WO | WO 2017/091543 A1 | 6/2017 |

OTHER PUBLICATIONS

Partial European Search Report, dated Oct. 8, 2018, for European Application No. 17807054.6.
International Search Report (PCT/ISA/210) issued in PCT/KR2017/005785, dated Sep. 12, 2017.

* cited by examiner

NEGATIVE ELECTRODE ACTIVE MATERIAL, NEGATIVE ELECTRODE INCLUDING THE SAME AND LITHIUM SECONDARY BATTERY INCLUDING THE SAME

CROSS-REFERENCE TO RELATED APPLICATION

This application claims priority to and the benefit of Korean Patent Application No. 10-2016-0068956, filed on Jun. 2, 2016, Korean Patent Application No. 10-2016-0068940, filed on Jun. 2, 2016, and Korean Patent Application No. 10-2017-0068856, filed on Jun. 2, 2017 the disclosure of which is incorporated herein by reference in their entirety.

TECHNICAL FIELD

The present invention relates to a negative electrode active material, a negative electrode including the same and a lithium secondary battery including the same.

BACKGROUND ART

With a recent trend of miniaturization and weight lightening of electronic devices, miniaturization and weight lightening of batteries used therein as a power supply also have been also required. Lithium secondary batteries are commercialized as batteries that are small, light, chargeable and dischargeable with high capacity, and used in portable electronic devices such as small video cameras, mobile phones and laptops, communication devices, etc.

Generally, a lithium secondary battery is formed with a positive electrode, a negative electrode, a separator and an electrolyte, and charge and discharge are possible due to lithium ions perform a role of transferring energy while travelling back and forth between both electrodes, for example lithium ions coming out of a positive electrode active material and being intercalated into a negative electrode active material, that is, carbon particles, by first charge, and deintercalated again during discharge.

Further, with the development of portable electronic devices, high capacity batteries have been continuously required, and research has been actively conducted on high capacity negative electrode materials such as tin, silicon or the like having significantly higher capacity per unit weight compared to carbon used currently as negative electrode material. Among them, a negative electrode material using silicon has about 10 times higher capacity than a negative electrode material using carbon.

As a result, research has been conducted on a negative electrode material with high capacity using silicon in which there is no damage to the electrode even when lithium is intercalated and deintercalated repeatedly.

PRIOR ART LITERATURE

Patent Literature (Patent Literature 1) KR2005-0090218A

DISCLOSURE

Technical Problem

The present invention provides a negative electrode active material which can prevent a negative electrode from expanding and contracting due to an electrochemical reaction between lithium ions, which are discharged from a positive electrode during charging and discharging of lithium secondary batteries, and silicon, which are included in a negative electrode.

The present invention provides a negative electrode active material having many paths through which lithium ions can move.

The present invention provides a lithium secondary battery having high capacity and high output characteristics.

The present invention provides a lithium secondary battery which can increase initial efficiency and has improved rate capability.

Technical Solution

According to an embodiment of the present invention, there is provided a negative electrode active material which includes a secondary particle including a first particle which is a primary particle, wherein the first particle includes a first core, and a first surface layer which is disposed on a surface of the first core and contains carbon, and the first core includes one or more of silicon and a silicon compound; and a metal compound which includes one or more of a metal oxide and a metal silicate.

According to another embodiment of the present invention, there is provided a negative electrode including the negative electrode active material.

According to still another embodiment of the present invention, there is provided a lithium secondary battery including the negative electrode.

Advantageous Effects

The negative electrode active material according to the present invention includes secondary particles including first particles which are primary particles, and thus paths through which lithium ions can move are allowed to increase such that output characteristics of a lithium secondary battery can be improved, an initial efficiency of the lithium secondary battery is high, and rate capability (charge and discharge characteristics) can be improved.

Further, according to the present invention, due to pores between the primary particles, damage to the electrode can be minimized even when intercalation and deintercalation of lithium ions are repeated and cores contract and expand repeatedly.

Further, according to the present invention, the initial efficiency of the battery can be further enhanced because the first core is doped with a metal compound.

Moreover, the first particle including the first core doped with the metal compound and the second particle including the second particle undoped with the metal compound is mixed at a suitable weight ratio, and thereby a battery having high capacity and excellent initial efficiency can be provided.

MODES OF THE INVENTION

The terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way.

While the invention has been described with reference to exemplary embodiments illustrated in accompanying drawings, these should be considered in a descriptive sense only, and it will be understood by those skilled in the art that various alterations and equivalent other embodiment may be made. Therefore, the scope of the invention is defined by the appended claims.

The negative electrode active material according to an embodiment of the present invention may include a secondary particle including a first particle which is a primary particle, where the first particle may include a first core, and a first surface layer which is disposed on a surface of the first core and contains carbon, and the first core may include one or more of silicon and a silicon compound; and a metal compound which includes one or more of a metal oxide and a metal silicate.

Figure 1:
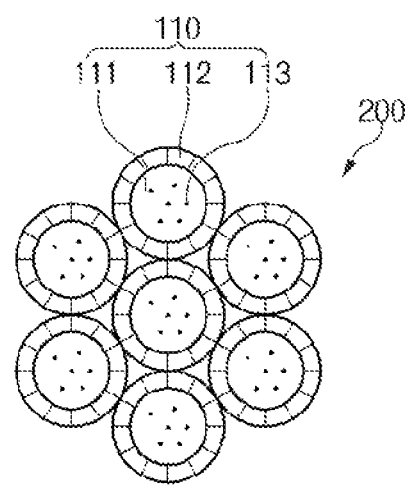
FIG. 1 is a schematic view showing a cross section of a negative electrode active material according to an embodiment of the present invention.

FIG. 1 is a schematic view showing a cross section of a negative electrode active material according to an embodiment of the present invention.

Referring to FIG. 1, the negative electrode active material includes a secondary particle 200 including first particles 110 which are primary particles. Here, the term "secondary particle" refers to a particle formed by aggregation of primary particles.

The first particle 110 may include a first core 111 and a first surface layer 112.

The first core 111 may include one or more of silicon and a silicon compound; and a metal compound 113.

Since the silicon has a theoretical capacity of about 3,600 mAh/g, the silicon has a very high capacity compared to existing negative electrode active material including graphite, and thus the capacity of a lithium secondary battery including the silicon can be improved.

The silicon compound refers to a compound containing silicon, and may be a silicon oxide ($SiO_x$, $0<x<2$) in which silicon is dispersed in a silicon dioxide ($SiO_2$), a Si—C physically or chemically combined with a carbon-based material, or a silicon alloy (Si-alloy) combined with a metal, and specifically may be a silicon oxide ($SiO_x$, $0<x<2$), and more specifically may be $SiO_x$ ($0<x\leq1$) for example, SiO.

When the silicon oxide ($SiO_x$, $0<x<2$) is included in the first core 111, since the silicon oxide ($SiO_x$, $0<x<2$) has less volume expansion during intercalation and deintercalation of lithium ions due to charging and discharging of a lithium secondary battery compared to silicon, it is possible to reduce damage to a negative electrode active material, and to realize high capacity and high initial efficiency which are effects of the silicon.

The silicon in the silicon oxide ($SiO_x$, $0<x\leq1$) may be amorphous or crystalline. When the silicon in the silicon oxide ($SiO_x$, $0<x\leq1$) is crystalline, a crystal size may be more than 0 to 30 nm or less. When the above-described range is satisfied, a lithium secondary battery as a final product can have a higher capacity than an existing lithium secondary battery including graphite, and have the improved initial efficiency.

The first cores 111 may each be a porous core including a plurality of pores. The porous core increases the contact area between an electrolyte and an electrode such that lithium ions can be rapidly diffused.

When the first core 111 is a porous core, an internal porosity of the first core 111 may be in the range of 5 to 90% based on the total volume of the first core 111. Here, the porosity refers to a "pore volume per unit mass/specific volume+pore volume per unit mass," and may be measured by mercury porosimetry or Brunauer-Emmett-Teller (BET) measurement method. When the above-described range is satisfied, the volume expansion of the first core 111 during charging and discharging can be suppressed, mechanical strength is excellent, and durability capable of withstanding the manufacturing process of a battery such as roll pressing can be attained.

The average particle size $D_{50}$ of the first core 111 may be in the range of 0.5 to 20 μm, and specifically may be in the range of 0.5 to 5 μm. When the average particle size $D_{50}$ of the first core 111 is in the range of 0.5 to 20 μm aggregation is easy in forming the secondary particle, sintering does not occur even when charging and discharging are repeated, and thus cracking of a negative electrode can be prevented. Further, a change in Volume during charging and discharging can be effectively prevented. Moreover, the exterior of the electrode can be smoothly formed, and thus an active material layer can be smoothly roll-pressed during the production of the electrode. Accordingly, an energy density per unit volume can be improved. In the present specification, the average particle size $D_{50}$ can be defined as a particle size on the basis of 50% of the particle size distribution of particles. The average particle size $D_{50}$ may be measured using, for example, a laser diffraction method. The laser diffraction method generally enables measurement of a particle size of several millimeters to submicronic levels, such that results with high reproducibility and high resolvability can be obtained.

The BET specific surface area of the first core 111 may be in the range of 0.5 to 30 $m^2/g$.

The metal compound 113 may be formed by oxidation of a metal having a reducing power capable of reducing a silicon compound, specifically, silicon dioxide ($SiO_2$) in the silicon compound to silicon. The metal compound 113 may include one or more of a metal oxide and a metal silicate.

The metal oxide may include an oxide of one or more metals selected from the group consisting of lithium (Li), magnesium (Mg), aluminum (Al), calcium (Ca), and titanium (Ti). Specifically, the metal oxide may be one or more of MgO, $MgSi_3$ and $Mg_2SiO_4$.

The metal silicate may include a silicate of one or more metals selected from the group consisting of lithium (Li), magnesium (Mg), aluminum (Al), calcium (Ca) and titanium (Ti).

The metal compound may be formed of a metal with which the first core is doped. When the first core is doped with the metal, the $SiO_2$ matrix in SiO can be reduced and a metal compound can be formed. Accordingly, since the content of $SiO_2$ which causes initial irreversible reaction, can be reduced, the initial efficiency of the battery can be improved.

The weight of the metal compound 113 may be in the range of 1 to 50 wt %, and specifically in the range of 2 to 50 wt % based on the total weight of the first particle. When the above-described range is satisfied, initial efficiency can be effectively improved, an excess amount of heat is not generated during the reduction reaction of $SiO_2$, and the crystal size of Si can thus be prevented from becoming excessively large. Further, most of the doped metals participate in the reaction, and thereby metal impurities may not be generated.

The first surface layer 112 may contain carbon and may be disposed on the surface of the first core 111. The first surface layer 112 prevents additional oxidation of the surface of the first core 111. The first surface layer 112 may form a conductive path in the negative electrode active material to improve the electrical conductivity of the negative electrode active material. The first surface layer 112 increases the capacity per unit volume of the first particle 110, and thereby high capacity can be exhibited.

The carbon may be amorphous carbon or crystalline carbon. When the amorphous carbon is included in the first surface layer 112, the strength between the first surface layers 112 can be suitably maintained such that expansion of the first core 111 can be suppressed. When the crystalline carbon is included in the first surface layer 112, conductivity of a negative electrode active material can be further improved. The crystalline carbon may be fluorene, carbon nanotubes or graphene.

The first surface layers 112 may each independently include a carbide of one or more selected from the group consisting of tar, pitch, and other organic materials, and specifically, the first surface layers 112 may each be independently formed of a tar carbide, a pitch carbide, or a carbide of other organic materials. The carbide of other organic materials may be a carbide of an organic material selected from the group consisting of sucrose, glucose, galactose, fructose, lactose, mannose, ribose, aldohexose, ketohexose, and combinations thereof.

The first surface layers 112 may each independently include one or more pyrolysis products selected from the group consisting of substituted or unsubstituted aliphatic or alicyclic hydrocarbons, substituted or unsubstituted aromatic hydrocarbons, products obtained in the tar distillation process vinyl-based resins, phenol-based resins, cellulose-based resins, and pitch-based resins. For example, pyrolysis products such as the substituted or unsubstituted aliphatic or alicyclic hydrocarbons, substituted or unsubstituted aromatic hydrocarbons, or the like may be used as a carbon source for chemical vapor deposition.

Specific examples of the substituted or unsubstituted aliphatic or alicyclic hydrocarbons include methane, ethane, ethylene, acetylene, propane, butane, butene, pentane, isobutane, hexane, etc.

Specific examples of the substituted or unsubstituted aromatic hydrocarbons include benzene, toluene, xylene, styrene, ethylbenzene, diphenylmethane, naphthalene, phenol, cresol, nitrobenzene, chlorobenzene, indene, coumarone, pyridine, anthracene, phenanthrene, etc.

Examples of the products obtained in the tar distillation process include gas diesel, creosote oil, anthracene oil, naphtha-cracked tar oil, etc.

The first surface layer 112 may include a conductive polymer containing carbon, and the conductive polymer may include one or more selected from the group consisting of polycellulose sulfonate polyacetylene polyparaphenylene, poly(p-phenylenevinylene), polypyrrole, polythiophene, polyaniline polyisothianaphthene, polyparamethylene, poly(1-pyrene methyl methacrylate) which is a homopolymer of pyrene, poly(1-pyrene methyl methacrylate-cotriethylene oxide methyl ether methacrylate) which is a copolymer of pyrene, a polymer obtained by changing a pyrene side chain of the pyrene homopolymer or copolymer to an anthracene, a polymer having a carbonyl group and methyl benzoic ester, and a polyacetylene having a conjugation bond.

The first surface layer 112 may be included at 2 to 50 parts by weight based on 100 parts by weight of the first core 111. The thickness of each of the first surface layer 112 may be in the range of 20 to 100 nm. When the above-described range is satisfied, the electrical conductivity of the lithium secondary battery can be improved while the conductive paths of the first cores 111 are maintained.

The average particle size $D_{50}$ of the first particles 110 may be in the range of 0.502 to 20.2 μm, and specifically in the range of 0.502 to 5.2 μm. When the above-described range is satisfied, aggregation for forming the secondary particle is easy, sintering does not occur even when charging and discharging are repeated, and a change in size can be prevented. In addition, high output characteristics can be exhibited.

Referring to FIG. 1, the secondary particle 200 is formed by aggregation of the first particles 110, and include pores between the first particles 110. The porosity between the first particles 110 is in the range of 2 to 50% based on the total volume of the secondary particle 200. When the above-described range is satisfied, a buffer area can be provided with respect to the volume expansion of the first core 111 during charging and discharging, and it is possible to prevent the secondary particle 200 from being crushed. Further, the moving speed of lithium ions is raised to improve output characteristics.

The definition and measurement method of the porosity between the first particles 110 are mentioned in the description of the internal porosity of the porous particles, and thus the description thereof will be omitted.

The average particle size of the secondary particle 200 may be in the range of 2 to 50 μm, and specifically may be in the range of 2 to 42 μm. When the above-described range is satisfied, paths through which lithium ions can move increase, and thus a lithium secondary battery as a final product can exhibit high capacity, high power, high initial efficiency, and excellent rate capability.

Figure 2:
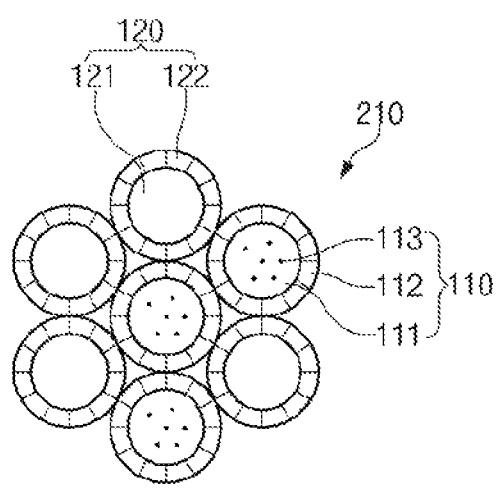
FIG. 2 is a schematic view showing a cross section of a negative electrode active material according to another embodiment of the present invention.

A negative electrode active material according to another embodiment of the present invention is the same as the above-described negative electrode active material according to an embodiment of the present invention except that the secondary particle further includes second particles which are primary particles. Referring to FIG. 2, the secondary particle 210 further include second particles 120 which are primary particles in addition to the first particles 110, the second particle 120 includes a second core 121, and a second surface layer 122 which is disposed on a surface of the second core 121 and contains carbon, and the second core 121 may include one or more of silicon and a silicon compound. Here, the first particles 110 are the same as the first particles described with reference to FIG. 1, and thus a description thereof will be omitted.

The second particle 120 may include a second core 121 and a second surface layer 122.

The second core 121 may include one or more of silicon and a silicon compound.

Since the silicon has a theoretical capacity of about 3,600 mAh/g, the silicon has a very high capacity compared to the existing negative electrode active material including graphite, and thus the capacity of a lithium secondary battery including the silicon can be improved.

The silicon compound refers to a compound containing silicon, and may be a silicon oxide ($SiO_x$, $0<x<2$) in which silicon is dispersed in a silicon dioxide ($SiO_2$) matrix, a Si—C physically or chemically combined with a carbon-based material, or a silicon alloy (Si-alloy) combined with a metal, and specifically may be a silicon oxide ($SiO_x$, $0<x<2$), and more specifically may be $SiO_x$ ($0<x\geq1$), for example, SiO.

When the silicon oxide ($SiO_x$, $0<x<2$) is included in the second core 121, since the silicon oxide ($SiO_x$, $0<x<2$) has less volume expansion during intercalation and deintercalation of lithium ions due to charging and discharging of a lithium secondary battery than silicon, it is possible to reduce damage to a negative electrode active material and to realize high capacity and high initial efficiency which are effects of the silicon.

The silicon in the silicon oxide ($SiO_x$, $0<x\leq1$) may be amorphous or crystalline. When the silicon in the silicon oxide ($SiO_x$, $0<x\geq1$) is crystalline, a crystal size may be more than 0 to 30 nm or less. When the above-described range is satisfied, a lithium secondary battery as a final product can have a higher capacity than an existing lithium secondary battery including graphite, and have the improved initial efficiency.

The second core 121 may each be a porous core including a plurality of pores. The porous core increases the contact area between an electrolyte and an electrode such that lithium ions can be rapidly diffused.

When the second core 121 is a porous core, an internal porosity of the second core 121 may be in the range of 5 to 90% based on the total volume of the second core 121. Here, the porosity refers to a "pore volume per unit mass/specific volume+pore volume per unit mass", and may be measured by a mercury porosimetry or Brunauer-Emmett-Teller (BET) measurement method. When the above-described range is satisfied, the volume expansion of the second core 121 during charging and discharging can be suppressed, mechanical strength is excellent, and durability capable of withstanding the manufacturing process of a battery such as roll pressing can be attained.

The average particle size $D_{50}$ of the second core 121 may be in the range of 0.5 to 20 μm, and specifically may be in the range of 0.5 to 5 μm. When the average particle size $D_{50}$ of the second core 121 is in the range of 0.5 to 20 μm, aggregation is easy in forming the secondary particle, sintering does not occur even when charging and discharging are repeated, and thus cracking of a negative electrode can be prevented. Further, a change in volume during charging and discharging can be effectively prevented. Moreover, the exterior of the electrode can be smoothly formed, and thus an active material layer can be smoothly roll-pressed during the production of the electrode. Accordingly, an energy density per unit volume can be improved.

The BET specific surface area of the second core 121 may be in the range of 0.5 to 30 $m^2$/g.

The second surface layer 122 may contain carbon and may be disposed on the surface of the second core 121. The second surface layer 122 prevents additional oxidation of the surface of the second core 121. The second surface layer 122 may form a conductive path in the negative electrode active material to improve the electrical conductivity of the negative electrode active material. The second surface layer 122 increases the capacity per rant volume of the second particle 120, and thereby high capacity can be exhibited.

The carbon may be amorphous carbon or crystalline carbon. When the amorphous carbon is included in the second surface layer 122, the strength between the second surface layers 122 can be suitably maintained such that expansion of the second core 121 can be suppressed. When the crystalline carbon is included in the second surface layer 122, conductivity of a negative electrode active material can be further improved. The crystalline carbon may be fluorene, carbon nanotubes, or graphene.

The second surface layer 122 may each independently include a carbide of one or more selected from the group consisting of tar, pitch and other organic materials, and specifically, the second surface layer 122 may each be independently formed of a tar carbide, a pitch carbide, or a carbide of other organic materials. The carbide of other organic materials may be a carbide of an organic material selected from the group consisting of sucrose, glucose, galactose, fructose, lactose, mannose, ribose, aldohexose or ketohexose carbides, and combinations thereof.

The second surface layer 122 may each independently include one or more pyrolysis products selected from the group consisting of substituted or unsubstituted aliphatic or alicyclic hydrocarbons, substituted or unsubstituted aromatic hydrocarbons, products obtained in the tar distillation process, vinyl-based resins, phenol-based resins, cellulose-based resins, and pitch-based resins. For example, pyrolysis products such as the substituted or unsubstituted aliphatic or alicyclic hydrocarbons, substituted or unsubstituted aromatic hydrocarbons or the like may be used as a carbon source for chemical vapor deposition.

Specific examples of the substituted or unsubstituted aliphatic or alicyclic hydrocarbons include methane, ethane, ethylene, acetylene, propane, butane, butene, pentane, isobutane, hexane, etc.

Specific examples of the substituted or unsubstituted aromatic hydrocarbons include benzene, toluene, xylene, styrene, ethylbenzene, diphenylmethane, naphthalene, phenol, cresol, nitrobenzene, chlorobenzene, indene, coumarone, pyridine, anthracene, phenanthrene, etc.

Examples of the products obtained in the tar distillation process include gas diesel, creosote oil, anthracene oil, naphtha-cracked tar oil, etc.

The second surface layer 122 may include a conductive polymer containing carbon, and the conductive polymer may include one or more selected from the group consisting of polycellulose sulfonate, polyacetylene, polyparaphenylene, poly(p-phenylenevinylene), polypyrrole polythiophene, polyaniline, polyisothianaphthene, polyparamethylene, poly(1-pyrene methyl methacrylate) which is a homopolymer of pyrene, poly(1-pyrene methyl methacrylate-cotriethylene oxide methyl ether methacrylate) which is a copolymer of pyrene, a polymer obtained by changing a pyrene side chain of the pyrene homopolymer or copolymer to an anthracene, a polymer having a carbonyl group and methyl benzoic ester, and a polyacetylene having a conjugation bond.

The second surface layer 122 may be included at 2 to 50 parts by weight based on 100 parts by weight of the second core 121. The thickness of each of the second surface layer 122 may be in the range of 20 to 100 nm. When the above-described range is satisfied, the electrical conductivity of the lithium secondary battery can be improved while the conductive paths of the second cores 121 are maintained.

The average particle size $D_{50}$ of the second particle 120 may be in the range of 0.502 to 20.2 µm, and specifically in the range of 0.502 to 5.2 µm. When the above-described range is satisfied, aggregation for forming the secondary particle is easy, sintering does not occur even when charging and discharging are repeated, and a change in size can be prevented. In addition, high output characteristics can be exhibited.

In the negative electrode active material of the present embodiment described with reference to FIG. 2, although the first particles 110 have a larger mass than the second particles 120, the charge and discharge characteristics of the battery can be improved by doping with a metal during manufacturing. Further, since the second particles 120 have a high lithium binding amount, the high capacity characteristics of the battery can be improved. Therefore, when the battery includes the negative electrode including the secondary particle 210 formed by the first particles 110 and the second particles 120, both the high capacity and excellent charge and discharge characteristics of the battery can be achieved.

The weight ratio of the first particles 110 and the second particles 120 may be in the range of 1:0.25 to 1:4, and specifically, may be in the range of 1:0.43 to 1:1.5. When the weight ratio is satisfied, the high capacity and excellent charge and discharge characteristics of the battery can be achieved at a more preferable level, and the effect of reducing the expansion of the thickness of the electrode can be obtained.

Referring to FIG. 2, the secondary particle 210 is formed by aggregation of the first particles 110 and the second particles 120, and includes pores between the first particles 110, pores between the second particles 120, and pores between the first particles 110 and the second particles 120. The total porosity between the first particles 110, between the second particles 120, and between the first particles 110 and the second particles 120 is in the range of 2% to 50% based on the total volume of the secondary particle 210. When the above-described range is satisfied, a buffer area can be provided with respect to the volume expansion of the first core 111 and the second core 121 during charging and discharging, and it is possible to prevent the secondary particle 210 from being crushed. Further, the moving speed of lithium ions is raised to improve output characteristics.

The definition and measurement method of the porosity between the first particles 110, the porosity between the second particles 120, and the porosity between the first particles 110 and the second particles 120 are mentioned in the description of the internal porosity of the porous particles, and thus the description thereof will be omitted.

The average particle size of the secondary particle 210 may be in the range of 2 to 50 µm, specifically in the range of 2 to 42 µm, and more specifically in the range of 4 to 30 µm. When the above-described range is satisfied, paths through which lithium ions can move increase, and thus a lithium secondary battery as a final product can exhibit high capacity, high power, high initial efficiency and excellent rate capability.

Figure 3:
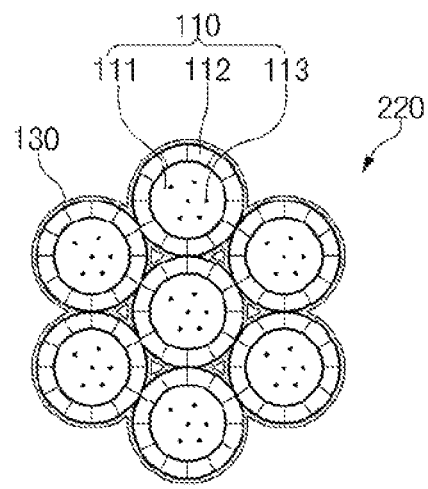
FIG. 3 is a schematic view showing a cross section of a negative electrode active material according to still another embodiment of the present invention.

Referring to FIG. 3, the negative electrode active material according to still another embodiment of the present invention is similar to the negative electrode active material according to an embodiment of the present invention described with reference to FIG. 1, but differs only in that the secondary particle 220 includes a carbon layer 130. Accordingly, the carbon layer 130 corresponding to the difference will be mainly described.

The carbon layer 130 is disposed on the surface of the secondary particle, and specifically is disposed on the surface of the structure in which the first particles 110 are aggregated to form the secondary particle 220. Due to the carbon layer 130, the expansion of secondary particle can be suppressed during charging and discharging and the conductivity of the negative electrode active material can be further improved.

The carbon layer 130 may contain carbon. Specifically, the carbon layer 130 may be one or more materials which can form the surface layer 112 described above. Further, the carbon layer 130 and the surface layer 112 may be formed of the same material, or may be formed of different material. More specifically, the surface layer and the carbon layer may all be formed of the above-described carbides of the other organic materials, or the surface layer may be a carbide of other organic materials, and the carbon layer may be a pitch carbide.

The thickness of the carbon layer 130 may be in the range of 5 to 100 µm, and specifically, may be in the range of 10 to 100 mm. When the above-described range is satisfied, the electrical conductivity of the lithium secondary battery can be improved while maintaining the conductive path between the secondary particles.

The content of the carbon layer may be in the range of 0.1 to 50 wt %, and specifically, in the range of 5 to 25 wt % based on the total weight of the secondary particle. When the above-described range is satisfied, a conductive path for the movement of lithium ions can be secured. When the carbon layer is formed at a level higher than the above-described range, the initial efficiency may be excessively decreased.

Figure 4:
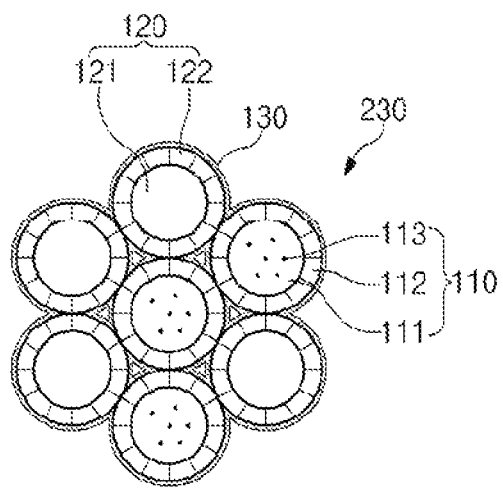
FIG. 4 is a schematic view showing a cross section of a negative electrode active material according to yet another embodiment of the present invention.

Referring to FIG. 4, the negative electrode active material according to yet another embodiment of the present invention is similar to the negative electrode active material according to an embodiment of the present invention described with reference to FIG. 2, but differs only in that the secondary particle 230 includes a carbon layer 130. Since the carbon layer 130 included in the negative electrode active material of the present embodiment is the same as the carbon layer included in the negative electrode active material of an embodiment described with reference to FIG. 3, the description thereof will be omitted.

Figure 5:
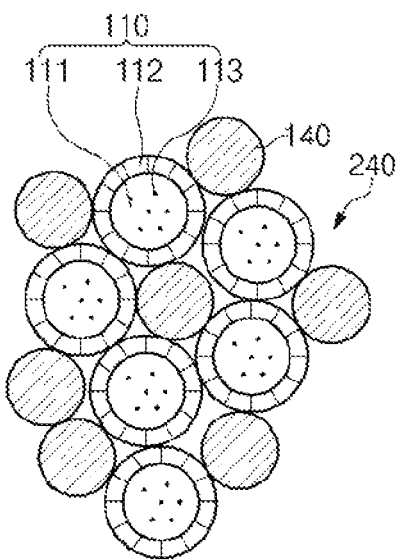
FIG. 5 is a schematic view showing a cross section of a negative electrode active material according to yet another embodiment of the present invention.

Referring to FIG. 5, the negative electrode active material according to yet another embodiment of the present invention is similar to the negative electrode active material according to an embodiment of the present invention described with reference to FIG. 1, but differs only in that the secondary particle 240 includes crystalline carbon-based materials 140. Accordingly, the difference will be mainly described.

The crystalline carbon-based materials 140 may be primary particles. Accordingly, the crystalline carbon-based material 140 aggregates with the first particles 110 to form the secondary particle 240. Specifically the crystalline carbon-based materials 140 are mixed with the first particles 110 in a solvent, and a mixture thereof is dried and calcined to form a secondary particle structure.

The description of the first particle 110 is as described above.

The crystalline carbon-based material 140 can improve the capacity and cycle characteristics of a lithium secondary battery. Specific examples of the crystalline carbon-based material 140 include graphene, carbon nanotubes, nanofibers, etc.

The content of the crystalline carbon-based material 140 may be in the range of 75 to 95 parts by weight based on 100 parts by weight of the first particles 110. When the above-described range is satisfied, the capacity and cycle characteristics of the lithium secondary battery as a final product can be further improved.

Figure 6:
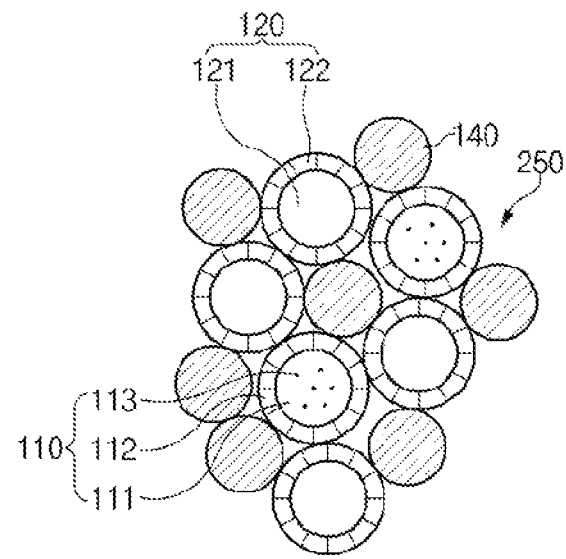
FIG. 6 is a schematic view showing a cross section of a negative electrode active material according to yet another embodiment of the present invention.

Referring to FIG. 6, the negative electrode active material according to yet another embodiment of the present invention is similar to the negative electrode active material according to an embodiment of the present invention described with reference to FIG. 1, but differs only in that the secondary particle 250 includes crystalline carbon-based materials 140. Since the crystalline carbon-based materials 140 included in the secondary particles 250 of the negative electrode active material of the present embodiment are the same as the crystalline carbon-based materials included in the secondary particles 240 of the negative electrode active material of an embodiment described with reference to FIG. 5, the description thereof will be omitted.

The negative electrode active material according to yet another embodiment of the present invention is similar to the negative electrode active materials of the embodiments described with reference to FIGS. 1 to 6, but differs in that the negative electrode active material further includes graphite-based active material particles. The graphite-based active material particles may be used together with the secondary particles of the above-described embodiments. Specifically, the graphite-based active material particles may be mixed with the secondary particles, and the negative electrode active material may be a mixture of two types of active materials. Accordingly, the charge and discharge characteristics of the battery can be improved. The graphite-based active material particle may be one or more selected from the group consisting of artificial graphite, natural graphite, graphitized carbon fibers and graphitized mesocarbon microbeads.

The weight ratio of the secondary particles and the graphite-based active material particles in the negative electrode active material may be in the range of 1:1 to 1:49, and specifically, may be in the range of 1:9 to 1:19. When the above-described range is satisfied, the charge and discharge characteristics of the battery are further improved and the pores between the secondary particles can be ensured, such that damage to the electrode can be minimized even when the contraction and expansion of the secondary particle are repeated. The graphite-based active material particles may be mixed together with the prepared secondary particles in a solvent and used for the production of the negative electrode.

A method of preparing a negative electrode active material according to yet another embodiment of the present invention includes preparing a core including one or more of silicon or a silicon compound (Step 1); forming a surface layer containing carbon on the surface of the core to form a preliminary first particle (Step 2); forming a first particle by doping the preliminary first particle with a metal and performing heat treatment (Step 3); and forming a secondary particle including the first particles (Step 4). Here, the core includes the first core and the second core of the above-described embodiments, the surface layer is the same as the first surface layer and the second surface layer of the above-described embodiments, and the first particles are the same as the first particles of the above-described embodiments.

In Step 1, the core may be prepared by pulverizing silicon or a silicon compound having a high average particle size $D_{50}$ to have an average particle size $D_{50}$ of 0.5 to 20 µm. Specifically, the core may be prepared by introducing a silicon oxide having an average particle size $D_{50}$ of 5 to 50 µm into a bead mill with a zirconia ball and pulverizing in the presence of an ethanol solvent. However, the present invention is not limited thereto, and the core may be formed of silicon or a silicon compound obtained by performing beat treatment on a silicon oxide in a temperature range of 1,100° C. or less in an inert gas or reducing atmosphere. Here, the silicon oxide is a general term of an amorphous silicon oxide obtained by cooling and precipitating silicon monoxide gas produced by heating a mixture of silicon dioxide and metal silicon. Further, specific examples of the inert gas include Ar, He, $H_2$, and $N_2$, and they may be used alone or as a mixed gas. The temperature of the precipitation plate for cooling and precipitating the silicon monoxide gas may be in the range of 500 to 1,050° C.

Further, the core may be silicon obtained by heating and evaporating metallic silicon in a vacuum and precipitating it on a cooling plate.

When the carbon is carbon included in the carbides of the other organic materials described above, Step 2 may include Step 2-1 of pulverizing a mixture of the core and the other organic materials in a solvent by a milling process and drying, and Step 2-2 of spheroidizing the mixture and performing heat treatment thereon to carbonize the organic material to form a surface layer containing carbon on the surface of the core to form a preliminary first particle.

The solvent is not particularly limited as long as the other organic materials can be dispersed uniformly and may be an alcohol such as ethanol, n-butanol, 1-propanol, or 2-propanol. The content of the organic solvent may be in the range of 100 to 300 parts by weight based on 100 parts by weight of the particles.

The milling process is performed such that the core and the organic materials are pulverized to a desired size, the particles and the organic materials are well mixed in the solvent, and the organic materials are thereby uniformly distributed on the surface of the particle. The milling process may be carried out using a beads mill, a high energy ball mill, a planetary mill, a stirred ball mill, a vibration mill, etc. Here, the bead mill or the ball mill may be formed of a chemically inert material which does not react with silicon and organic materials, and as a specific example, may be formed of a zirconia material.

The drying may be performed in a temperature range in which the solvent can be evaporated or volatilized, and the temperature range may be in the range of 60 to 150° C.

Instead of the other organic materials described above, the carbon may be derived from any of the sources of the surface layer described above.

When the carbon is carbon included in the pyrolysis product, Step 2 may be a step of forming a surface layer containing carbon on the surface of the core by chemical vapor deposition.

When the chemical vapor deposition method is used, the surface layer can be uniformly formed on the surface of the core.

When the chemical vapor deposition is performed, the temperature may be in the range of 700 to 1,200° C., and a material capable of generating carbon by pyrolysis at the above-described temperature is selected as the carbon source. The carbon source may be one or two or more selected from the group consisting of substituted or unsubstituted aliphatic or alicyclic hydrocarbons, and substituted or unsubstituted aromatic hydrocarbons.

When the carbon is carbon included in a conductive polymer, the core may be dip-coated in a solution containing the conductive polymer to form a surface layer on the core. The description of the conductive polymer is as described above.

Further, the core may be coarse ground in an inert atmosphere to obtain a desired average particle size. Moreover, the mixture of the core and the other organic materials may further include a crystalline carbon-based material.

In Step 3, the preliminary first particles may be uniformly mixed with metal powder in a state in which air is blocked, and then heat-treated in an argon gas atmosphere in a furnace. Thereafter, the metal powder or the side reaction material remaining on the particle surface is removed by washing with strong acid or the like. Accordingly, a second particle including a core containing a metal compound can be prepared. Specifically, the heat treatment may be performed by raising the temperature from 900° C. to 1100° C. at a heating rate of 4 to 6° C./min, and then heating for 1 to 3 hours. When doping with a metal and heat treatment are performed before the secondary particles are formed, the metal compound formed by oxidation of the metal may be more uniformly distributed in the final active material particle compared to the case which doping with a metal and heat treatment are performed after the secondary particles are formed such that the metal compound is included in the core.

In Step 4, the first particles are aggregated to form a secondary particle. Specifically, when a solution containing the first particles and the solvent is prepared and the solution is spray-dried, a secondary particle in which the first particles aggregate may be formed. The solution may further include a carbon precursor to facilitate aggregation of the first particles and the second particles.

The solvent is not particularly limited as long as it allows the first particles to be well dispersed, and specific examples thereof include water, alcohols, N-methyl-2-pyrrolidone (NMP), dimethylsulfoxide (DMSO), acetonitrile, acetone, tetrahydrofuran (THF), diethyl ether, toluene, 1,2-dichlorobenzene, etc.

The inlet temperature during the spray drying may be in the range of 100 to 250° C.

The secondary particle may be further subjected to a separate calcination process for improving durability and conductivity. The calcination temperature may be in the range of 400 to 1,000° C.

In Step 4, the secondary particle may be formed by aggregation such that the porosity between the first particles is in the range of 2% to 50%. Specifically, in Step 4, a filler is included in the solvent together with the first particles to prepare a solution, and the solution is spray-dried to form a preliminary secondary particle in which the first particles and the filler are aggregated.

The filler is included to form a secondary particle such that the porosity between the first particles is in the range of 2% to 50%, and the porosity may be controlled by adjusting the amount of the filler. The filler may be included in a volume ratio of 1:0.01 to 1:0.43 with respect to the first particle. Specific examples of the filler include a metal, polymethyl methacrylate (PMMA), polystyrene beads, sodium chloride (NaCl), potassium chloride (KCl), sodium sulfate ($Na_2SO_4$), etc.

When the above-described calcination process is included in Step 4, the filler may be sodium chloride, calcium chloride, or sodium sulfate. When the calcination process is performed at 900 to 1,000° C., the filler may be polymethyl methacrylate (PMMA), sodium chloride, calcium chloride, or sodium sulfate.

The preliminary secondary particle may be further subjected to ultrasonic treatment and a drying process after water or a mixture of water and ethanol is added to remove the filler. Accordingly, the secondary particle having a porosity in the range of 2% to 50% may be prepared.

A method of preparing a negative electrode active material according to yet another embodiment of the present invention is similar to the above-described method of preparing a negative electrode active material according to an embodiment of the present invention, except that the preliminary primary particles are used as second particles to form a secondary particle further including the first particles and the second particles in Step 4. Specifically, not only the first particles but also the second particles may be aggregated together to form a secondary particle in Step 4.

In this case, the secondary particle may also be formed by aggregation such that the porosity between the tint particles and the second particles is in the range of 2% and 50% in Step 4. Specifically, in Step 4, a solution is prepared by containing the first particles, the second particles, and the filler in a solvent, and the solution is spray-dried to form a preliminary secondary particle in which the first particles, the second particles, and the fuller are aggregated.

The filler is included to form a secondary particle such that the porosity between the first particles and the second particles is in the range of 2% to 50%, and the porosity may be controlled by adjusting the amount of the filler. The filler may be included in a volume ratio of 1:0.01 to 1:0.43 with respect to the to the primary particles (the first particles and the second particles). Specific examples of the filler include a metal, polymethyl methacrylate (PMMA), polystyrene beads, sodium chloride (NaCl), potassium chloride (KCl), sodium sulfate ($Na_2SO_4$), etc.

When the above-described calcination process is included in Step 4, the filler may be sodium chloride, calcium chloride, or sodium sulfate. When the calcination process is performed at 900 to 1,000° C. the filler may be polymethyl methacrylate (PMMA), sodium chloride, calcium chloride, or sodium sulfate.

The preliminary secondary particle may be further subjected to ultrasonic treatment and a drying process after water or a mixture of water and ethanol is added to remove the filler. Accordingly, the secondary particle having a porosity in the range of 2% to 50% may be prepared.

Hereinafter, a lithium secondary battery according to yet another embodiment of the present invention will be described.

The lithium secondary battery according to yet another embodiment of the present invention includes an electrode assembly including a positive electrode, a negative electrode and a separator interposed between the positive electrode and the negative electrode, and an electrolyte.

The positive electrode may include a positive electrode current collector, and a mixture of a positive electrode active material, a conductive material and a binder on the positive electrode current collector.

The positive electrode current collector is required to have high conductivity, allow the mixture to be easily adhered, and be non-reactive at a voltage range of a battery. Specific examples of the positive electrode current collector include aluminum, nickel, alloys thereof, etc. The thickness of the positive electrode current collector may be in the range of 3 to 500 μm.

Specific examples of the positive electrode active material include lithium cobalt oxides such as $Li_{x1}CoO_2$ (0.5<x1<1.3); lithium nickel oxide such as $Li_{x2}NiO_2$ (0.5<x2<1.3); lithium manganese oxides such as $Li_{1+x3}Mn_{2-x}O_4$ (0≤x3≤0.33), $LiMnO_3$, $LiMn_2O_3$, or $Li_{x4}MnO_2$ (0.5<x4<1.3); lithium copper oxides such as $Li_2CuO_2$; lithium iron oxides such as $LiFe_3O_4$; lithium nickel cobalt manganese oxides such as $Li[Ni_{xa}Co_{ya}Mn_{za}]O_2$ (xa+ya+za=1, 0<xa<1, 0<ya<1, 0<za<1); lithium nickel cobalt aluminum oxides such as $Li[Ni_{xb}Co_{yb}Al_{zb}]O_2$ (xb+yb+zb=1, 0xb<1, 0<yb<1, 0<zb<1); lithium vanadium compounds such as $LiV_3O_8$; nickel-site type lithium nickel oxides such as $LiNi_{1-x4}M_{x4}O_2$ (M=Co, Mn, Al, Cu, Fe, Mg, B or Ga, 0.01≤x4≤0.3); lithium manganese composite oxides such as $LiMn_{2-x5}M_{x5}O_2$ (M=Co, Ni, Fe, Cr, Zn or Ta, 0.01≤x5≤0.1) or $Li_2Mn_3MO_8$ (M=Fe, Co, Ni, Cu or Zn); $LiMn_2O_4$ in which a part of lithium is substituted with an alkaline earth metal ions; disulfide compounds; vanadium oxides such as $V_2O_5$ or $Cu_2V_2O_7$; $Fe_2(MoO_4)_3$, etc. More specifically, the positive electrode active material may be a lithium nickel cobalt manganese oxide such as $Li[Ni_{xc}Co_{yc}Mn_{zc}]O_2$ (xc+yc+zc=1, 0.3≤xc≤0.4, 0.3≤yc≤0.4, 0.3≤zc≤0.4) or a lithium nickel cobalt aluminum oxide such as $Li[Ni_{xd}Co_{yd}Al_{zd}]O_2$ (xd+yd+zd=1, 0.3≤xd≤0.4, 0.3≤yd≤0.4, 0.3≤zd≤0.4). One or two or more thereof may be included in the positive electrode active material.

The conductive material is a material having electrical conductivity without causing a chemical change in the lithium secondary battery of the present invention Specific examples of the conductive material include conductive materials such as graphite such as natural graphite or artificial graphite; carbon black such as carbon black, acetylene black, ketjen black, channel black, furnace black, lamp black, thermal black, and the like; conductive fibers such as carbon fibers and metal fibers; metal powders such as carbon fluoride, aluminium, and nickel powder; conductive whiskers such as zinc oxide, potassium titanate, and the like; conductive metal oxides such as titanium oxide; polyphenylene derivatives, etc.

The binder is a component which assists in bonding between the positive electrode active material and the conductive material and in bonding to the current collector. Specific examples of the binder include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM) rubber, a hydrogenated nitrile butadiene rubber (HNBR), a sulfonated ethylene propylene diene, a styrene butadiene rubber (SBR), a fluorine rubber, various copolymers, etc.

The negative electrode includes a negative electrode current collector and a negative electrode active material positioned on the negative electrode current collector.

The negative electrode current collector is required to have high conductivity, allow the negative electrode active material to be easily adhered, and be non-reactive at a voltage range of a battery. Specific examples of the negative electrode current collector include copper, gold, nickel, or alloys thereof.

The description of the negative active material is the same as that of the negative active materials of the above-described embodiments The separator prevents a short circuit between the positive electrode and the negative electrode, and provides a path for lithium ions. An insulating thin film having high ion permeability and mechanical strength may be used as the separator. Specific examples of the separator include a polyolefin-based polymer membrane such as polypropylene and polyethylene, or a multiple membrane thereof, a microporous film, a woven fabric, a nonwoven fabric, etc. When a solid electrolyte such as a polymer is used as an electrolyte to be described later, the solid electrolyte may also serve as a separator.

The electrolyte may be an electrolyte containing a lithium salt. Specific examples of the anion of the lithium salt include $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO_-$, $(CF_3SO_2)_2CH^-$, $(SF_5)_3C^-$, $(CF_3SO_2)_3C^-$, $CF_3(CF_2)_7SO_3^-$, $CF_3CO_2^-$, $SCN^-$, $(CF_3CF_2SO_2)_2N^-$, etc. One or more thereof may be included in the electrolyte.

The outer shape of the lithium secondary battery according to yet another embodiment of the present invention is not particularly limited, and specific examples thereof include a cylindrical battery using a can, square, pouch or coin type batteries, etc.

The lithium secondary battery according to yet another embodiment of the present invention may be used in a battery cell used as a power source for a small device, and may be preferably used as a unit battery in a middle or large sized battery module including a plurality of battery cells. Specific examples of the middle or large sized battery module include an electric vehicle, a hybrid electric vehicle, a plug-in hybrid electric vehicle, a system for electric power storage or the like, but are not limited thereto.

Hereinafter, the present invention will be described in more detail with reference to the following examples. These examples are provided only for illustration of the present invention and should not be construed as limiting the scope and spirit of the present invention. Various modifications and alterations of the invention fall within the scope of the invention and the scope of the invention is defined by the accompanying claims.

Example 1: Preparation of Negative Electrode Active Material

<Preparation of Core>

Silica oxides ($SiO_x$, 0<x<1) having an average particle size $D_{50}$ of 10 μm were placed in a Spex mill 8000M, and 15 pieces of a sus ball media were added thereto, and milled for 2 hours to pulverize the particles to an average particle size $D_{50}$ of 1 μm to prepare a core.

<Preparation of Preliminary First Particle>

10 g of the core and 0.5 g of sucrose were added to 30 g of isopropanol to prepare a solution. The mixture was pulverized for 12 hours at a bead rotation rate of 1,200 rpm using beads formed of zirconia (average particle size: 0.3 mm). Subsequently, the mixture was dried in an oven at 120° C. for 2 hours. The dried mixture was pulverized again in a mortar and classified to form silicon particles mixed with sucrose. The heat treatment was performed at 800° C. under a nitrogen atmosphere to carbonize the sucrose to form a surface layer having a thickness of 2 nm to prepare preliminary first particles. The content of the surface layer was 2.1 wt % based on the total weight of the core.

<Preparation of First Particle>

8 g of the preliminary first particles and 0.9 of magnesium powder were mixed in an argon gas atmosphere to prepare a mixed powder. The mixed powder was placed in a tube furnace and heated to 1030° C. at a rate of 5° C./min in an argon gas atmosphere, followed by heating for 2 hours. Thereafter, the temperature of the reaction furnace was lowered to room temperature, and the heat-treated mixed powder was taken out and washed with 1M HCl for 1 hour while stirring. The washed mixed powder was washed with distilled water while filtering, and then dried in an oven at 60° C. for 8 hours to prepare first particles. As a result of analyzing the prepared first particles, the content of magnesium silicate and magnesium oxide formed by oxidation of magnesium in the first particles was 15 wt % based on the total weight of the first particles, which was measured by quantitative analysis using X-ray diffraction (XRD).

<Preparation of Secondary Particle>

The solution containing the first particles and ethanol/water (volume ratio=1:9) in a volume ratio of 1:10 was stirred with a mechanical homogenizer at 10,000 rpm for 30 minutes to prepare a dispersion solution for spray drying. The dispersion solution was spray-dried under the conditions of an inlet temperature of 180° C., an aspirator of 95%, and a feeding rate of 12 of a mini spray-dryer (manufactured by Buchi Co., Ltd., model: B-290 Mini Spray-Dryer) to prepare preliminary secondary particles, which were then transferred to an alumina boat. The temperature of a tube furnace equipped with a quartz tube having a length of 80 cm and an inner diameter of 4.8 cm was raised to 600° C. at a rate of 10° C./min, and then calcined while maintaining the temperature for 2 hours to prepare secondary particles. The prepared secondary particles had a porosity it 1% and an average particle size $D_{50}$ of 5 μm. The porosity was measured by a mercury porosimeter method.

Example 2: Preparation of Negative Electrode Active Material

<Preparation of Core and Preliminary First Particle>

The core and the preliminary first particle were prepared in the same manner as in Example 1.

<Preparation of First Particle>

8 g of the preliminary first particles and 10 g of magnesium powder were mixed in an argon gas atmosphere to prepare a mixed powder. The mixed powder was placed in a tube furnace and heated to 1030° C. at a rate of 5° C./min in an argon gas atmosphere, followed by heating for 2 hours. Thereafter the temperature of the reaction furnace was lowered to room temperature, and the heat-treated mixed powder was taken out and washed with 1M HCl for 1 hour while stirring. The washed mixed powder was washed with distilled water while filtering, and then dried in an oven at 60° C. for 8 hours to prepare first particles. As a result of analyzing the prepared first particles, the content of magnesium silicate and magnesium oxide formed by oxidation of magnesium in the first particles was 51 wt % based on the total weight of the first particles, which was measured by quantitative analysis using X-ray diffraction (XRD).

<Preparation of Secondary Particle>

Secondary particles of Example 2 were prepared using the first particles by the same method as a method of preparing the secondary particles of Example 1. The prepared secondary particles had a porosity of 1% and an average particle size $D_{50}$ of 4 μm. The porosity was measured by a mercury porosimeter method.

Example 3: Preparation of Negative Electrode Active Material

<Preparation of Core>

Silica oxides ($SiO_x$, 0<x≤1) having an average particle size $D_{50}$ of 10 μm were placed in a Spex mill 8000M, and 15 pieces of a sus ball media were added thereto, and milled for 4 hours to pulverize the particles to an average particle size $D_{50}$ of 0.4 μm to prepare a core.

<Preparation of Preliminary First Particle>

Preliminary first particles on which surface layers having a thickness of 2 nm were formed were prepared using the core through the same method as a method of preparing the preliminary first particles of Example 1. The content of the surface layer was 2.1 wt % based on the total weight of the core.

<Preparation of First Particle>

First particles were prepared using the preliminary first particles through the same method as a method of preparing the first particles of Example 1. As a result of analyzing the prepared first particles, the content of magnesium silicate and magnesium oxide formed by oxidation of magnesium in the first particles was 15 wt % based on the total weight of the first particles, which was measured by quantitative analysis using X-ray diffraction (XRD).

<Preparation of Secondary Particle>

Secondary particles of Example 3 were prepared using the first particles by the same method as a method of preparing the secondary particles of Example 1. The prepared secondary particles had a porosity of 1% and an average particle size $D_{50}$ of 2 μm. The porosity was measured by a mercury porosimeter method.

Example 4: Preparation of Negative Electrode Active Material

<Preparation of Core>

Silica oxides ($SiO_x$, 0<x≤1) having an average particle size $D_{50}$ of 10 μm were placed in a Spex mill 8000M, and 15 pieces of a sus ball media were added thereto, and milled for 4 hours to pulverize the particles to an average particle size $D_{50}$ of 0.4 μm to prepare a core.

<Preparation of Preliminary First Particle>

Preliminary first particles on which surface layers having a thickness of 2 nm were formed were prepared using the core through the same method as a method of preparing the preliminary first particles of Example 1. The content of the surface layer was 2.1 wt % based on the total weight of the core.

<Preparation of First Particle>

8 g of the preliminary first particles and 5 g of magnesium powder were mixed in an argon gas atmosphere to prepare a mixed powder. The mixed powder was placed in a tube furnace and heated to 1030° C. at a rate of 5° C./min in an argon gas atmosphere, followed by heating for 2 hours. Thereafter, the temperature of the reaction furnace was lowered to room temperature, and the heat-treated mixed powder was taken out and washed with 1M HCl for 1 hour while stirring. The washed mixed powder was washed with distilled water while filtering, and then dried in an oven at 60° C. for 8 hours to prepare first particles. As a result of analyzing the prepared first particles, the content of magnesium silicate and magnesium oxide formed by oxidation of magnesium in the first particles was 55 wt % based on the total weight of the first particles, which was measured by quantitative analysis using X-ray diffraction (XRD).

<Preparation of Secondary Particle>

Secondary particles of Example 4 were prepared using the first particles by the same method as a method of preparing the secondary particles of Example 1. The prepared secondary particles had a porosity of 1% and an average particle size $D_{50}$ of 3 μm. The porosity was measured by a mercury porosimeter method.

Example 5: Preparation of Negative Electrode Active Material

<Preparation of Core and Preliminary First Particle>

Preliminary first particles on which surface layers having a thickness of 2 nm were formed were prepared through the same method as a method of preparing the core and the preliminary first particles of Example 1. The content of the surface layer was 2.1 wt % based on the total weight of the core.

<Preparation of First Particle>

First particles were prepared using the preliminary first particles through the method of preparing the first particles of Example 1. As a result of analyzing the prepared first particles, the content of magnesium silicate and magnesium oxide formed by oxidation of magnesium in the first particles was 15 wt % based on the total weight of the first particles, which was measured by quantitative analysis using X-ray diffraction (XRD).

<Preparation of Secondary Particle>

Secondary particles were prepared, through the first particles and the second particles, by using the preliminary first particles as the second particles. Specifically, after the first particles and the second particles were mixed in a weight ratio of 6:4, the solution containing the mixture and ethanol/water (Volume ratio=1:9) in a volume ratio of 1:10 was stirred with a mechanical homogenizer at 10,000 rpm for 30 minutes to prepare a dispersion solution for spray drying. The dispersion solution was spray-dried under the conditions of an inlet temperature of 180° C., an aspirator of 95%, and a feeding rate of 12 of a mini spray-dryer (manufactured by Buchi Ltd., model:B-290 Mini Spray-Dryer) to prepare preliminary secondary particles, which were then transferred to an alumina boat. The temperature of a tube furnace equipped with a quartz tube having a length of 80 cm and an inner diameter of 4.8 cm was raised to 600° C. at a rate of 10° C./min. and then calcined while maintaining the temperature for 2 hours to prepare secondary particles. The prepared secondary particles had a porosity of 1% and an average particle size $D_{50}$ of 5 µm. The porosity was measured by a mercury porosimeter method

Example 6: Preparation of Negative Electrode Active Material

<Preparation of Core, First Particle and Second Particle>

The core, the first particle and the second particle (preliminary first particle) were prepared in the same manner as in Example 5.

<Preparation of Negative Electrode Active Material>

The secondary particles were prepared in the same manner as in Example 6 except that the first particles and second particles were mixed in a weight ratio of 1.5:8.5. The prepared secondary particles had a porosity of 1% and an average particle size $D_{50}$ of 5 µm. The porosity was measured by a mercury porosimeter method.

Comparative Example 1: Preparation of Negative Electrode Active Material

<Preparation of Core and Preliminary First Particle>

Preliminary first particles on which surface layers having a thickness of 2 nm were formed were prepared through the same method as a method of preparing the core and the preliminary first particles of Example 1. The content of the surface layer was 2.1 wt % based on the total weight of the core.

<Preparation of Secondary Particle>

Secondary particles were prepared by the same method as the method of preparing the secondary particles of Example 1 except that the first particles of Example 1 were not used and the preliminary first particles were used. The prepared secondary particles had a porosity of 1% and an average particle size $D_{50}$ of 5 µm. The porosity was measured by a mercury porosimeter method.

Comparative Example 2: Preparation of Negative Electrode Active Material 8 g of the preliminary first particles which were prepared in Example 1 and 0.9 g of magnesium powder were mixed in an argon gas atmosphere to prepare a mixed powder. The mixed powder was placed in a tube furnace and heated to 1030° C. at a rate of 5° C./min in an argon gas atmosphere, followed by heating for 2 hours. Thereafter, the temperature of the reaction furnace was lowered to room temperature, and the heat-treated mixed powder was taken out and washed with 1M HCl for 1 hour while stirring. The washed mixed powder was washed with distilled water while filtering, and then dried in an oven at 60° C. for 8 hours to prepare a negative electrode active material in the form of a single particle. As a result of analyzing the prepared negative electrode active material, the content of magnesium silicate and magnesium oxide formed by oxidation of magnesium in the negative electrode active material was 15 wt % based on the total weight of the negative electrode active material, which was measured by quantitative analysis using X-ray diffraction (XRD).

Examples 7 to 12 and Comparative Examples 3 and 4: Preparation of Battery

<Preparation of Negative Electrode>

Each of the negative electrode active materials prepared in Examples 1 to 6 and Comparative Examples 1 and 2, fine graphite as a conductive material, and polyacrylonitrile as a binder were mixed in a weight ratio of 7:2:1 to prepare 0.2 g of a mixture. 3.1 g of N-methyl-2 pyrrolidone (NMP) as a solvent was added to the mixture to prepare a negative electrode mixture slurry. The negative electrode mixture slurry was applied onto a copper (Cu) metal thin film as a negative electrode current collector having a thickness of 20 µm and dried. Here, the temperature of the circulating air was 80° C. Subsequently, the resultant was roll-pressed, dried in a vacuum oven at 130° C. for 12 hours, and then punched to a circular shape of 1.4875 $cm^2$ to prepare each of negative electrodes of Examples 7 to 12.

<Preparation of Battery>

Each of the negative electrodes thus prepared was cut into a circular shape of 1.4875 $cm^2$, which was used as a negative electrode, and a lithium metal thin film cut into a circle of 1.4875 $cm^2$ was used as a positive electrode. A porous polyethylene separator was interposed between the positive electrode and the negative electrode, 0.5 wt % of vinylene carbonate was dissolved in a mixed solution in which ethyl methyl carbonate (EMC) and ethylene carbonate (EC) were mixed in a mixing volume ratio of 7:3, and then an electrolyte in which 1M $LiPF_6$ was dissolved was injected thereto to prepare a lithium coin half-cell.

Experimental Example 1: Evaluation of Discharge Capacity, Initial Efficiency, Capacity Retention Ratio and Electrode Thickness Change Ratio The batteries of Examples 7 to 12 and Comparative Examples 3 and 4 were charged and discharged to evaluate a discharge capacity, an initial efficiency, a capacity retention ratio and an electrode thickness change ratio, and the results are listed in the following Table 1.

Further, during the first and second cycles, charging and discharging was performed at 0.1 C, and during the 3rd through 49th cycles, charging and discharging was performed at 0.5 C. At the 50th cycle, charging and discharging was terminated in a charging state (lithium ions were put in the negative electrode), and after disassembling the battery, a thickness was measured and an electrode thickness change ratio was calculated.

Charging condition: CC(constant current)/CV(constant voltage)(5 mV/0.005 C current cut-off)

Discharging condition: CC(constant current) condition 1.5V

The discharge capacity (mAh/g) and initial efficiency (%) were derived from the result after charging and discharging once. Specifically, the initial efficiency (%) was derived by the following calculation.

Initial efficiency (%)=(discharge capacity after one discharge/one charge capacity)×100

Each of the capacity retention ratio and the electrode thickness change ratio was derived by the following calculation.

Capacity retention ratio (%)=(49 times discharge capacity/one discharge capacity)×100

Electrode thickness change ratio (%)=(final electrode thickness change amount/initial electrode thickness)×100

TABLE 1

|  | Active material | Discharge capacity (mAh/g) | Initial efficiency (%) | Capacity retention ratio (%) | Electrode thickness change ratio (%) |
| --- | --- | --- | --- | --- | --- |
| Example 7 | Example 1 | 1420 | 82.2 | 87.5 | 107 |
| Example 8 | Example 2 | 1400 | 84.2 | 87 | 108 |
| Example 9 | Example 3 | 1350 | 81.5 | 87.3 | 105 |
| Example 10 | Example 4 | 1300 | 83.5 | 87.2 | 109 |
| Example 11 | Example 5 | 1508 | 80.08 | 88 | 105 |
| Example 12 | Example 6 | 1520 | 75.5 | 87.0 | 115 |
| Comparative Example 3 | Comparative Example 1 | 1550 | 74.0 | 86.5 | 123 |
| Comparative Example 4 | Comparative Example 2 | 1320 | 80.1 | 80 | 110 |

Referring to Table 1, it can be confirmed that Examples 7 to 12 in which the active material according to the present invention was used were superior in terms of the initial efficiency, capacity retention rate, and electrode thickness change ratio as compared to Comparative Example 3. It can be seen that this was an effect obtained due to the core of the first particle containing a metal compound.

Further, it can be seen that Example 7 in which a negative electrode active material suitably containing 15 wt % of a metal compound in the core was used had a higher discharge capacity and a higher capacity retention rate compared to Example 8 in which a negative active material containing a metal compound at a high content of 51 wt % was used. In the case of Example 8, the metal doping amount for forming the metal compound was excessively high, and thus the crystal size of Si in the negative electrode active material was too large, and a part of the metal acted as an impurity, thereby adversely affecting battery life and lowering the capacity retention ratio. Further, Example 7 in which the negative electrode active material of Example 1 having a core with a suitable size of 1 µm was used had higher discharge capacity, initial efficiency, and capacity retention ratio compared to Example 9 in which the negative electrode active material of Example 3 having an excessively small core with a size of 0.4 µm was used.

This is because the irreversible reaction is increased due to an increase in the specific surface area when a small-sized core is used.

Examples 13 to 17 and Comparative Examples 5 and 6: Preparation of Battery

<Preparation of Negative Electrode>

A mixed negative electrode active material prepared by mixing each of the negative electrode active materials prepared in Examples 1 to 5 and Comparative Examples 1 and 2 with graphite (natural graphite) at a weight ratio of 1:9, carbon black as a conductive material, carboxylmethyl cellulose (CMC), and a styrene butadiene rubber (SBR) were mixed at a weight ratio of 95.8:1:1.7:1.5 to prepare 5 g. of a mixture. 28.9 g of distilled water was added to the mixture to prepare a negative electrode mixture slurry. The negative electrode mixture slurry was applied onto a copper (Cu) metal thin film as a negative electrode current collector having a thickness of 20 µm and dried. Here, the temperature of the circulating air was 60° C. Subsequently, the resultant was roll-pressed, dried in a vacuum oven at 130° C. for 12 hours, and then punched to a circular shape of 1.4875 $cm^2$ to prepare each of negative electrodes of Examples 13 to 17 and Comparative Examples 5 and 6.

<Preparation of Battery>

Each of the negative electrodes thus prepared was cut into a circular shape of 1.4875 $cm^2$, which was used as a negative electrode, and a lithium metal thin film cut into a circle of 1.4875 $cm^2$ was used as a positive electrode. A porous polyethylene separator was interposed between the positive electrode and the negative electrode, 0.5 wt % of vinylene carbonate was dissolved in a mixed solution in which ethyl methyl carbonate (EMC) and ethylene carbonate (EC) were mixed in a mixing ratio of 7:3, and then an electrolyte in which 1M $LiPF_6$ was dissolved was injected thereto to prepare a lithium coin half-cell.

Figure 7:
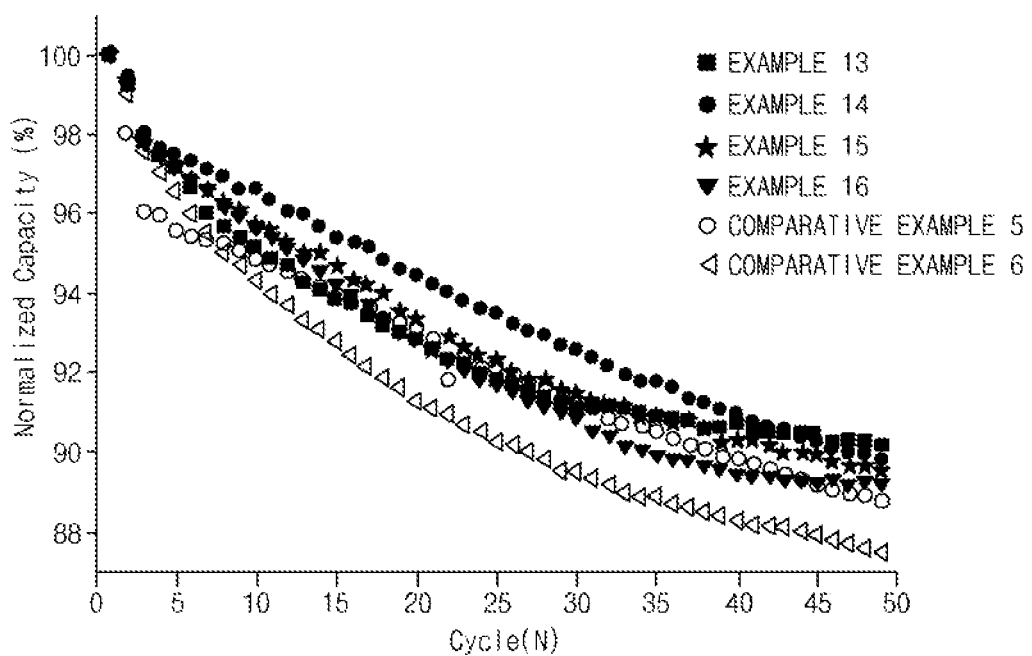
FIG. 7 is a graph showing normalized capacity of examples of the present invention and comparative examples.

Experimental Example 2: Evaluation of Initial Efficiency, Capacity Retention Ratio and Electrode Thickness Change Ratio The batteries of Examples 13 to 17 and Comparative Examples 5 and 6 were charged and discharged to evaluate an initial efficiency, a capacity retention ratio, and an electrode thickness change ratio, and the results are listed in the following Table 2. FIG. 7 shows the normalized capacity for each cycle number of Examples 13 to 16 and Comparative Examples 5 and 6.

Further, during the first and second cycles, charging and discharging was performed at 0.1 C, and during 3rd through 49th cycles, charging and discharging was performed at 0.5 C. At 50th cycle, charging and discharging was terminated in a charging state (lithium ions were put in the negative electrode), and after disassembling the battery, a thickness was measured and an electrode thickness change ratio was calculated.

Charging conditions: CC(constant current)/CV(constant voltage)(5 mV/0.005 C current cut-off)

Discharging conditions: CC(constant current) condition 1.5V

The initial efficiency (%) was derived from the result after charging and discharging once. Specifically, the initial efficiency (%) was derived by the following calculation.

Initial efficiency (%)=(discharge capacity after one discharge/one charge capacity)×100

Each of the capacity retention ratio and the electrode thickness change ratio was derived by the following calculation.

Capacity retention ratio (%)=(49 times discharge capacity/one discharge capacity)×100

Electrode thickness change ratio (%)=(electrode thickness change amount/initial electrode thickness)×100

TABLE 2

| | Active material | | Initial efficiency (%) | Capacity retention ratio (%) | Electrode thickness change ratio (%) |
|---|---|---|---|---|---|
| Example 13 | Example 1 | Graphite | 89.4 | 90.2 | 53.0 |
| Example 14 | Example 2 | Graphite | 90.2 | 89.8 | 53.2 |
| Example 15 | Example 3 | Graphite | 89.3 | 89.5 | 53.2 |
| Example 16 | Example 4 | Graphite | 90.1 | 89.2 | 53.3 |
| Example 17 | Example 5 | Graphite | 89.0 | 89.0 | 52.5 |
| Comparative Example 5 | Comparative Example 1 | Graphite | 86.1 | 88.8 | 53.4 |
| Comparative Example 6 | Comparative Example 2 | Graphite | 88.9 | 87.5 | 55.0 |

Referring to Table 2 and FIG. 7, it was confirmed that the batteries of Examples 13 to 17 according to the present invention were superior in initial efficiency and capacity retention ratio compared to the batteries of Comparative Examples 5 and 6. Further, in the case of Examples 13 to 17, it was confirmed that the performance was superior in terms of the initial efficiency, capacity retention rate, and electrode thickness change ratio, compared to Examples 7 to 12. Accordingly, it can be seen that, when the active material of the present invention is used together with graphite, more excellent effects can be obtained.

| [Description of Reference Numerals] | |
|---|---|
| 110: first particle | 111: first core |
| 112: first surface layer | 113: metal compound |
| 120: second particle | 121: second core |
| 122: second surface layer | 130: carbon layer |
| 140: crystalline carbon-based material | |
| 200, 210, 220, 230, 240 and 250: secondary particle | |

The invention claimed is:

1. A negative electrode active material, comprising a secondary particle including a first particle which is a primary particle and a second particle which is a primary particle, wherein the first particle includes a first core, and a first surface layer which is disposed on a surface of the first core, and the first core includes a mixture of:

one or more of silicon and a silicon compound; and a metal compound which includes one or more of a metal oxide and a metal silicate, the first surface layer includes a carbide of an organic material selected from the group consisting of sucrose, glucose, galactose, fructose, lactose, mannose, ribose, aldohexose, and ketohexose, wherein the one or more of silicon and the silicon compound is doped with the metal compound, wherein the metal oxide includes an oxide of one or more metal selected from the group consisting of magnesium (Mg), aluminum (Al), calcium (Ca), and titanium (Ti), wherein the metal silicate includes a silicate of one or more metal selected from the group consisting of magnesium (Mg), aluminum (Al), calcium (Ca), and titanium (Ti), wherein the porosity between a plurality of first particles is in the range of 2 to 50% based on the total volume of the secondary particle, and wherein the second particle is undoped with the metal compound and includes a second core and a second surface layer which is disposed on a surface of the second core and contains carbon, and the second core includes one or more of silicon and a silicon compound, and wherein a weight ratio of the first particle and the second particle is in a range of 1:0.25 to 1:4.

2. The negative electrode active material according to claim 1, wherein the metal compound is doped in an amount of 1 to 50 wt % based on the total weight of the first particle.

3. The negative electrode active material according to claim 1, wherein an average particle size $D_{50}$ of each of the first core and the second core is in a range of 0.5 to 20 μm.

4. The negative electrode active material according to claim 1, wherein the silicon included in each of the first core and the second core includes one or more of an amorphous silicon and a crystalline silicon having a crystal size of more than 0 to 30 nm or less.

5. The negative electrode active material according to claim 1, wherein the silicon compound included in each of the first core and the second core is a silicon oxide ($SiO_x$, 0<x<2) in which silicon is dispersed in a silicon dioxide ($SiO_2$) matrix.

6. The negative electrode active material according to claim 1, wherein the first core and the second core is a porous core including a plurality of pores.

7. The negative electrode active material according to claim 6, wherein an internal porosity of the porous core is in a range of 5% to 90% based on the total volume of the porous core.

8. The negative electrode active material according to claim 1, wherein a thickness of the first surface layer and the second surface layer is in a range of 1 to 100 nm.

9. The negative electrode active material according to claim 1, wherein the secondary particle has an average particle size $D_{50}$ in a range of 2 to 50 μm.

10. The negative electrode active material according to claim 1, wherein the negative electrode active material further comprises a carbon layer which is disposed on a surface of the secondary particle and contains carbon.

11. The negative electrode active material according to claim 10, wherein a thickness of the carbon layer is in a range of 5 to 100 nm.

12. The negative electrode active material according to claim 1, wherein the secondary particle further includes a crystalline carbon-based material which is a primary particle.

13. The negative electrode active material according to claim 1, wherein the negative electrode active material further comprises a graphite-based active material particle.

14. A negative electrode, comprising the negative electrode active material according to claim 1.

15. A lithium secondary battery, comprising the negative electrode according to claim 14.

* * * * *